(No Model.)
H. STRASSER.
PULVERIZING ATTACHMENT FOR CULTIVATORS.
No. 512,408. Patented Jan. 9, 1894.
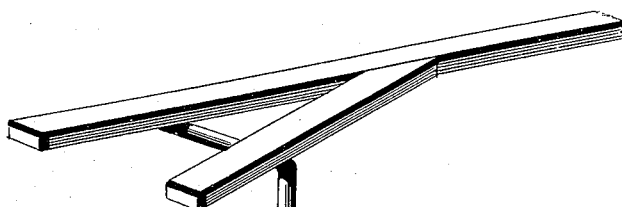
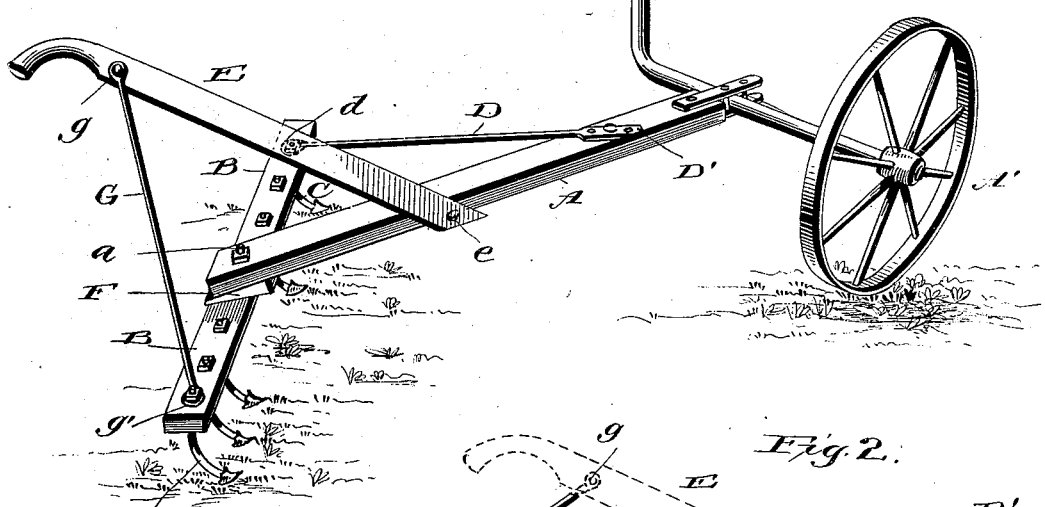
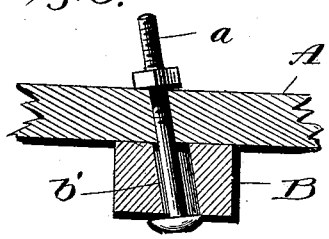
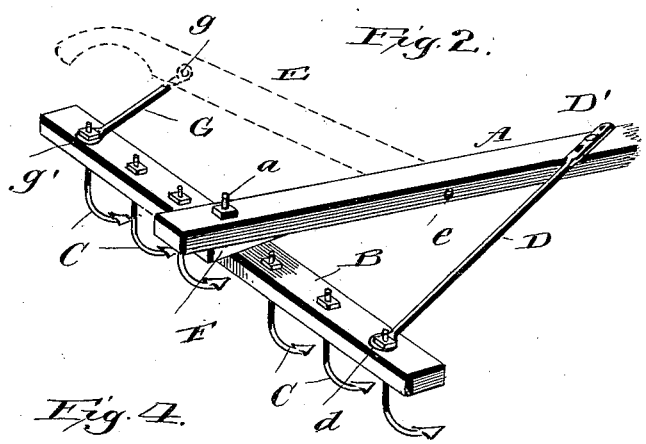
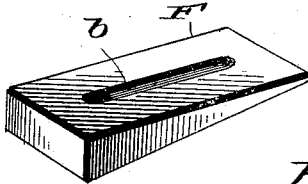
Witnesses:
Louis C. Hills
J. V. Jochum Jr.
Inventor:
Henry Strasser,
by Collamer & Co.
Asso. Attorneys.
THE NATIONAL LITHOGRAPHING COMPANY,
WASHINGTON, D. C.

UNITED STATES PATENT OFFICE.

HENRY STRASSER, OF THORNBURG, IOWA.

PULVERIZING ATTACHMENT FOR CULTIVATORS.

SPECIFICATION forming part of Letters Patent No. 512,408, dated January 9, 1894.

Application filed July 3, 1893. Serial No. 479,534. (No model.)

*To all whom it may concern:*

Be it known that I, HENRY STRASSER, a citizen of the United States, residing at Thornburg, in the county of Keokuk and State of Iowa, have invented certain new and useful Improvements in Pulverizing Attachments for Corn-Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to cultivators, and more especially to that class known as straddle-row; and the object of the same is to provide an improved pulverizing attachment for such cultivators.

Heretofore cultivators have been made wherein the drag bar was pivotally connected near its rear end to the center of the cross bar which carried the teeth. One extremity of the latter was adjustably connected by a rod with the drag bar so as to set the cross bar at the desired angle, and the handles were rigidly supported by the drag bar. At the point of connection a wedge has also heretofore been inserted between the two bars for tipping the drag bar down at the front.

The present invention consists in pivoting the handle to the drag bar and connecting it by a brace with one end of the cross bar whereby the latter may be borne down at one extremity by pressing on the handle, and it also consists in the specific form of pivotal bolt and wedge employed; all as set forth in the following specification and as illustrated in the accompanying drawings, wherein—

Figure 1 is a perspective view of the entire device. Fig. 2 is a similar view of the rear end of the device only with the cross bar adjusted at an oblique angle opposite to that shown in Fig. 1, and also showing the wedge as inserted from the rear to cant or tip the cross bar to the rear instead of to the front. Fig. 3 is a detail in section showing the cross bar and drag bar connected without the use of the wedge. Fig. 4 is a perspective detail of the wedge on an enlarged scale.

Referring to the accompanying drawings, the letter A designates the drag bar of a cultivator supported by a wheel A' and adapted to be drawn by a horse in the usual manner.

B is a cross bar carrying teeth C whose shanks are substantially upright, pass through the cross bar B, and receive nuts on their upper ends, and whose flattened portions or shares are pointed as shown and project forward from the bodies of the teeth. The drag bar and cross bar are connected by a bolt $a$ passing downward and slightly forward obliquely through the drag bar near its rear end and through a slot $b'$ in the cross bar B, whereby the latter is connected with the former in such manner that it may have some considerable play.

F is a wedge rectangular in plan and having a slot $b$ at its transverse center, which slot is of sufficient length to permit the wedge to be adjusted longitudinally, as will be clear. The wedge can be applied from the front to cause the front edge of the cross bar (and hence the teeth C) to be tipped down; or it can be applied from the rear to cause the teeth to be tipped up. In any event, the slight forward inclination of the bolt $a$ strongly resists the strain brought to bear upon the teeth in use.

The letter D represents the usual rod having an eye $d$ at one end which takes under the nut of the tooth at the forward end of the cross bar, and having its other end flattened as at D' and provided with a number of holes through one of which a pin, bolt, or screw is passed into the drag bar A so as to adjust the angle of inclination of the cross bar. With this common form of adjustment, however, I use an improved support for the handle E. The latter consists of an ordinary staff pivoted at $e$ to one side of the drag bar and rising thence to the rear above the cross bar, and it is braced by a brace rod G pivoted at one end as at $g$ to the handle and having an eye $g'$ at its other end loosely embracing the upper end of the tooth at the end of the cross bar. By this construction, when the angle of the cross bar is adjusted by the rod D, the brace rod G turns on its pivots as will be necessary, and the handle also turns on its pivot $e$ as will be further necessary. Therefore the brace for the handle needs no attention during the adjustment of the angle of the cross bar. Furthermore, the fact that the lower end of the brace rod G is loosely connected with the cross bar, permits the wedge to be adjusted so as to tip this bar either to the front or the rear, to be removed entirely, or to be replaced by a thicker or thinner wedge. Therefore this brace needs no attention during this adjustment of the cross bar.

The parts are of the desired sizes, shapes, and materials, and considerable change may be made from the precise construction herein set forth without departing from the spirit of my invention.

What I claim is—

1. In a pulverizing attachment for corn cultivators, the combination with the drag bar, the cross bar carrying teeth and having a slot through the center of its body, a wedge having a single longitudinal slot in its body, and a bolt passing obliquely downward and forward through said drag bar and through the slots in the wedge and cross bar; of means for adjusting the longitudinal angle of the drag bar with the cross bar, a handle pivoted to and rising from the drag bar, and a brace pivotally connected at one extremity with the upper end of the handle and having an eye at its other extremity loosely engaged with the tooth at one end of said cross bar, as and for the purpose set forth.

2. In a pulverizing attachment for corn cultivators, the combination with the drag bar, and the cross bar carrying teeth and centrally pivoted thereto; of a rod connected at one extremity with one end of the cross bar and adjustably connected at its other extremity with the drag bar, a handle pivoted to and rising from the drag bar, and a brace pivotally connected at one extremity with the upper end of the handle and having an eye at its other extremity loosely engaged with the tooth at the other end of said cross bar, as and for the purpose set forth.

In testimony whereof I affix my signature in presence of two witnesses.

HENRY STRASSER.

Witnesses:
F. L. GOELDNER,
H. C. MEYER.